N. KOCH & G. HAYN.
WHEELED GUN CARRIAGE.
APPLICATION FILED MAR. 12, 1912.

1,137,763

Patented May 4, 1915.
5 SHEETS—SHEET 1.

Witnesses
J. M. Rynkoop.
E. R. Heine.

Inventors:
Norbert Koch and
Georg Hayn,
By Knight Bros.
Attorneys.

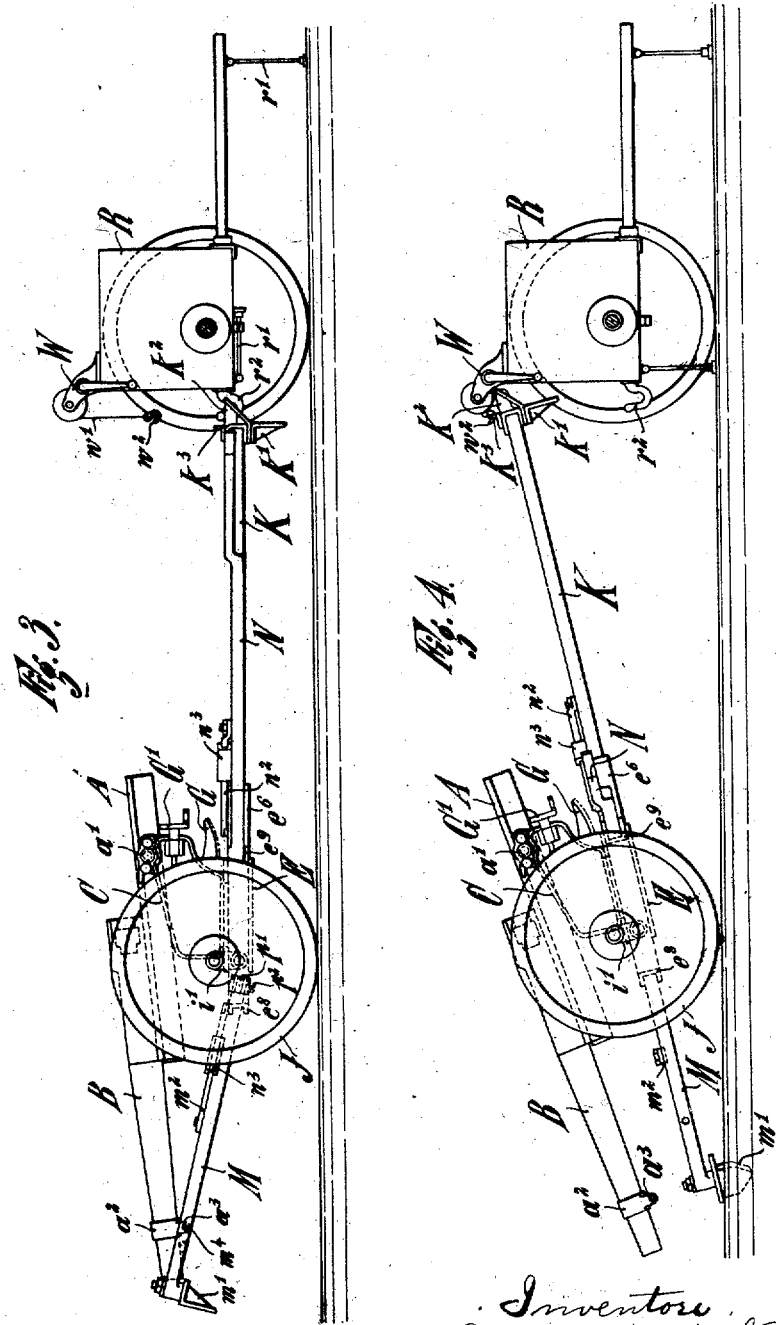

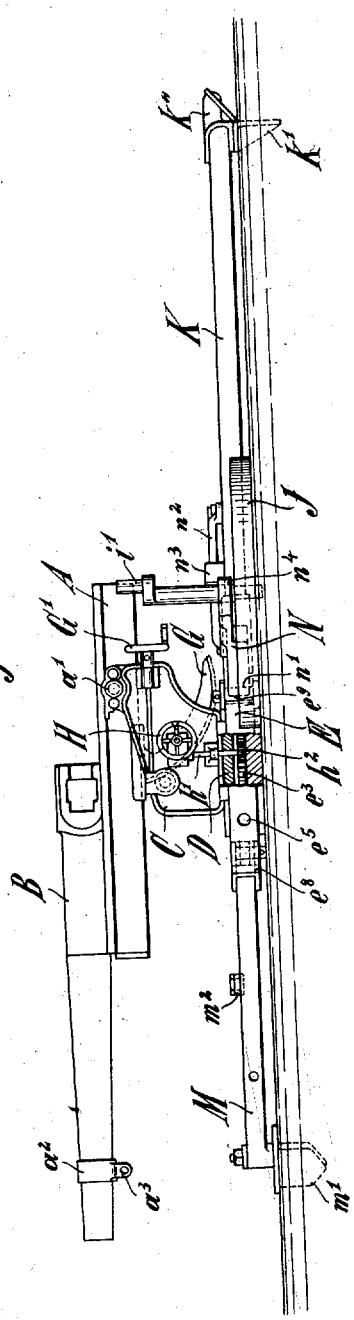
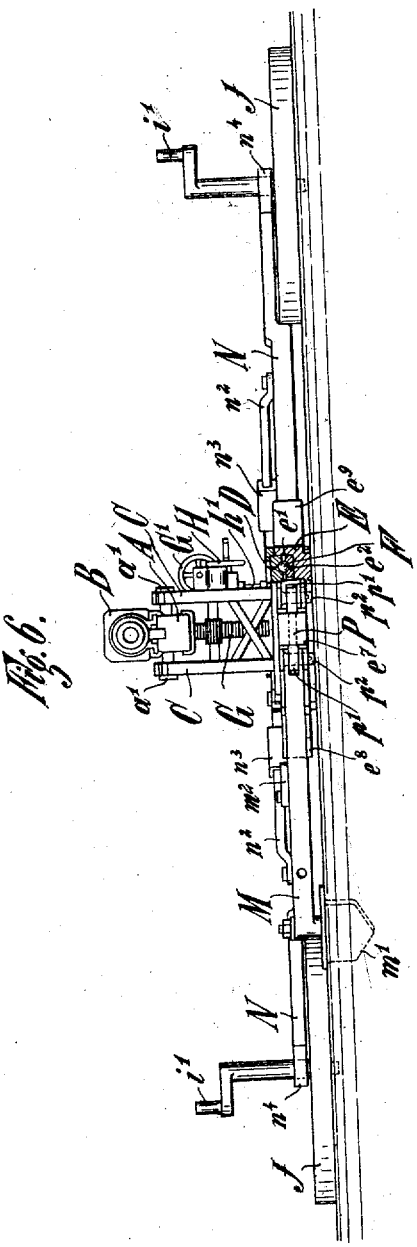

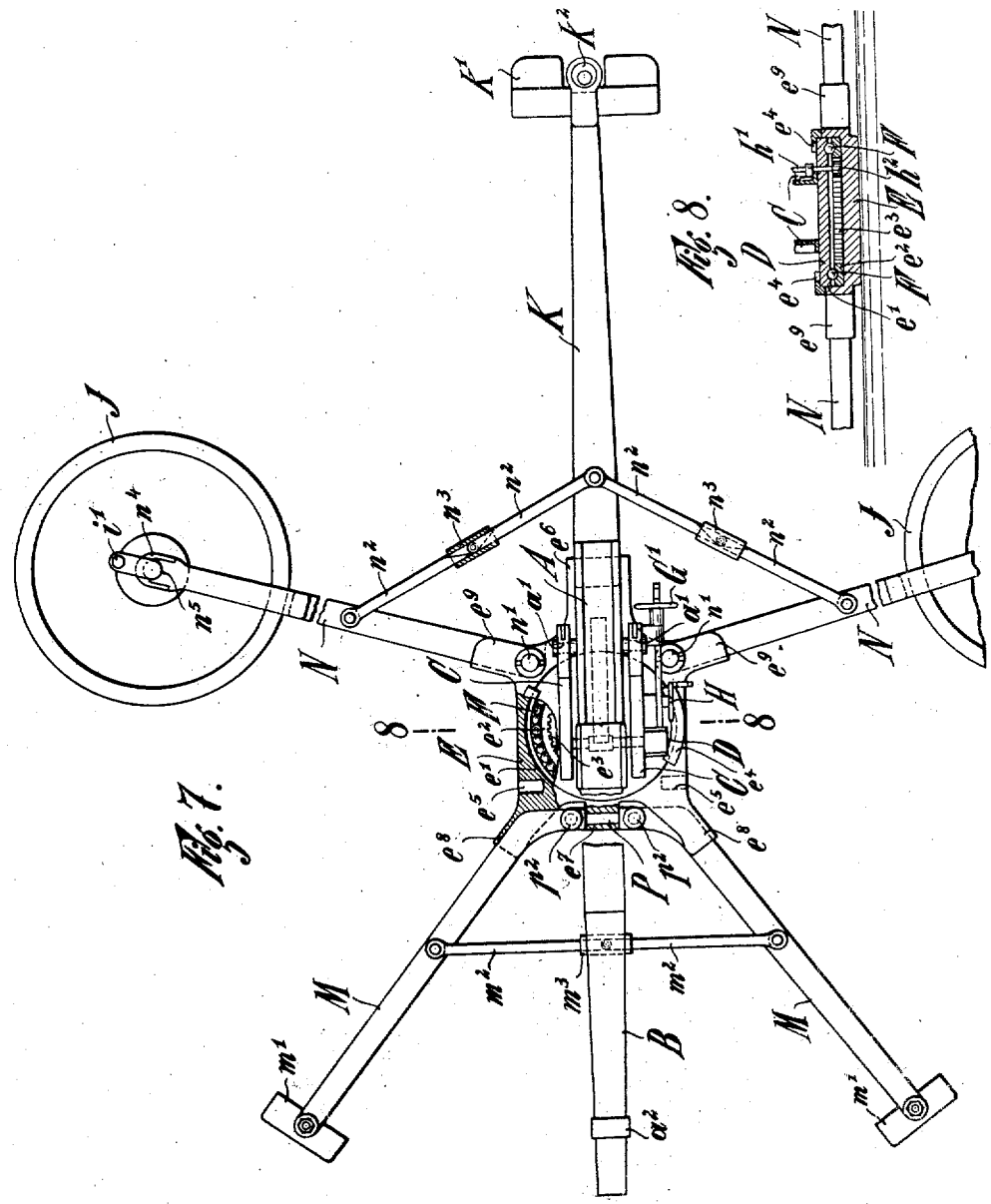

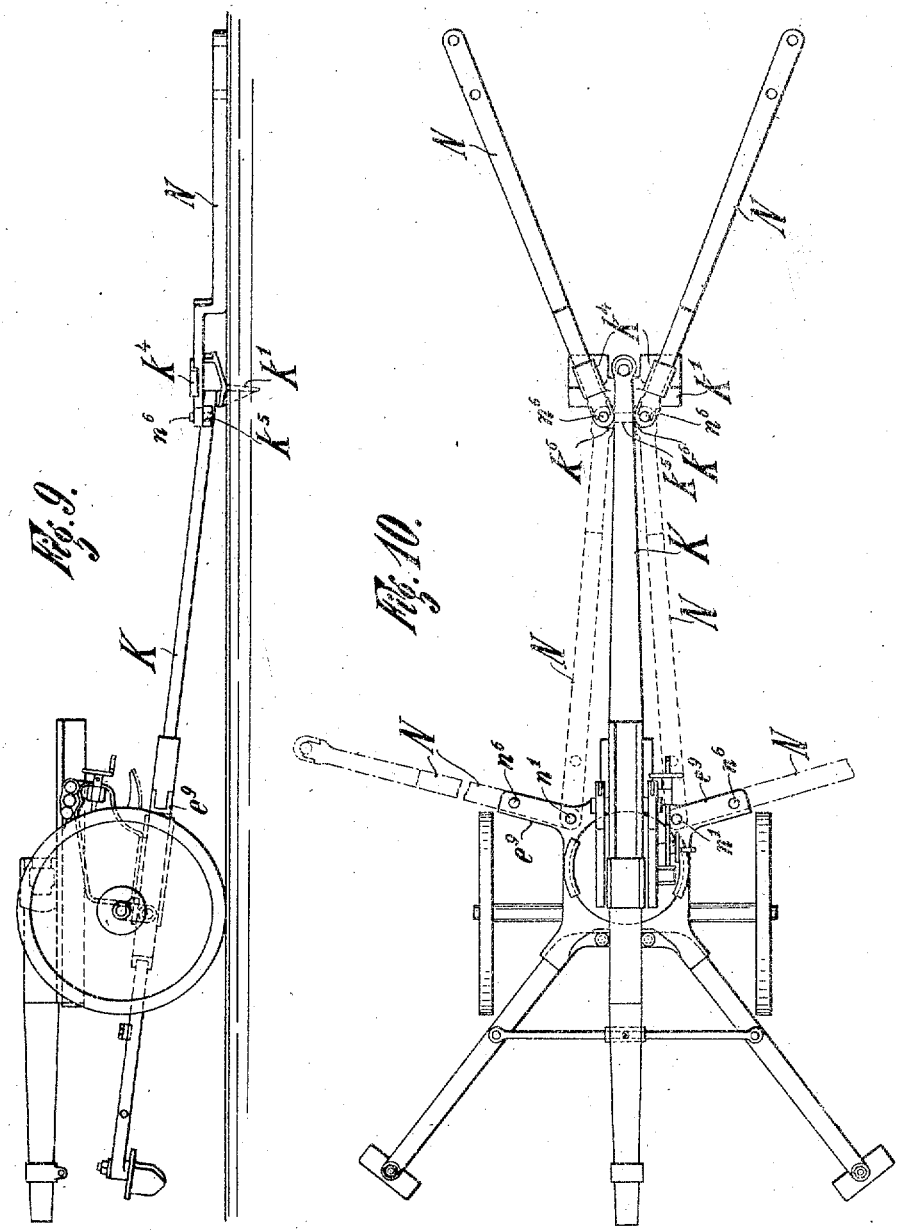

UNITED STATES PATENT OFFICE.

NORBERT KOCH, OF ESSEN-RELLINGHAUSEN, AND GEORG HAYN, OF ESSEN-ON-THE-RUHR, GERMANY, ASSIGNORS TO FRIED. KRUPP AKTIENGESELLSCHAFT, OF ESSEN-ON-THE-RUHR, GERMANY.

WHEELED GUN-CARRIAGE.

1,137,763.   Specification of Letters Patent.   Patented May 4, 1915.

Application filed March 12, 1912. Serial No. 683,370.

*To all whom it may concern:*

Be it known that we, NORBERT KOCH, residing at Essen-Rellinghausen, Germany, and GEORG HAYN, residing at Essen-on-the-Ruhr, Germany, both subjects of the Emperor of Germany, have invented a certain new and useful Improvement in Wheeled Gun-Carriages, of which the following is a specification.

The present invention relates to wheeled gun carriages so constructed, that they also may be used as pedestal mounts.

In the accompanying drawings is illustrated an embodiment of the present invention wherein—

Figure 1:
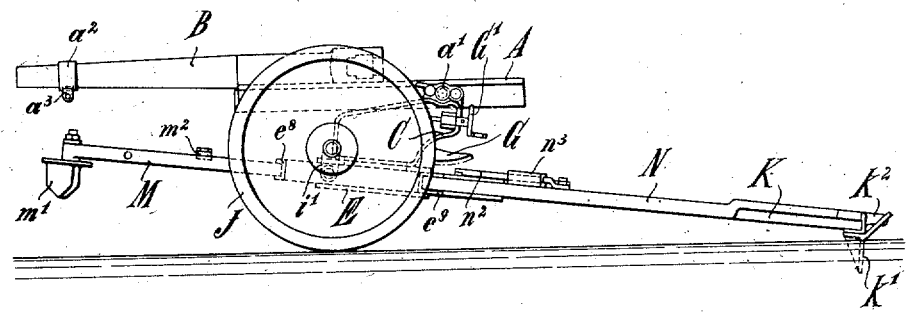
Figure 2:
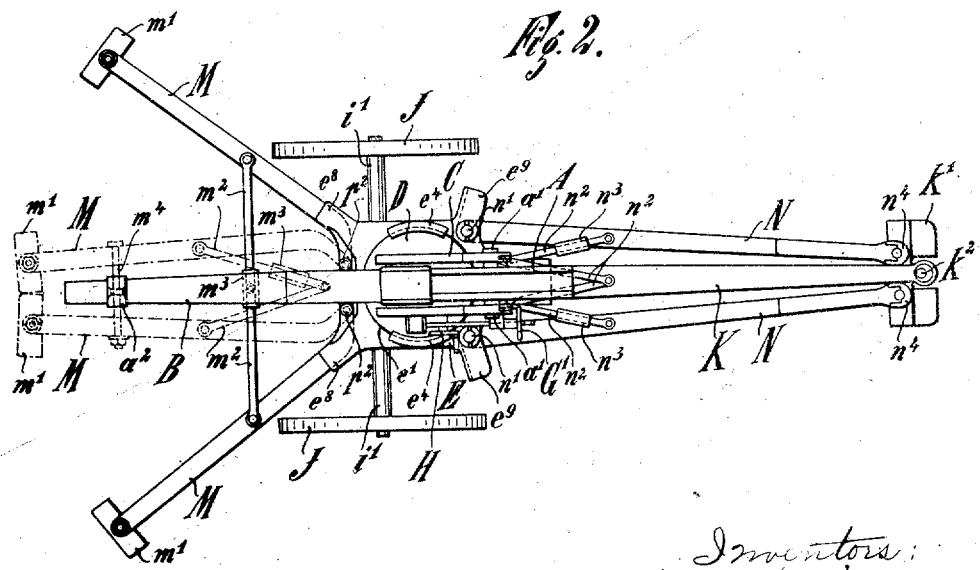

Figure 1 shows a side view of a gun carriage in firing position, when in use as field carriage; Fig. 2, a top plan view of Fig. 1; Fig. 3, a side view of the limbered-up gun carriage; Fig. 4, a side view of gun carriage and limber with the gun carriage in a different position; Fig. 5, a side view, partly in section and in larger scale of the gun carriage in firing position when in use as pedestal mount; Fig. 6, a front view of Fig. 5, partly in section; Fig. 7, a top plan view, partly in section of Fig. 5; Fig. 8, a section in line 8—8 of Fig. 7 seen from the left; Fig. 9, a side view similar to Fig. 1 with an arrangement for enlarging the supporting surface of the trail spade and Fig. 10, a top view of Fig. 9.

The carriage as illustrated in Figs. 1 to 8 will be described. The slide carrier A, which supports the gun B, is mounted to rock on the horizontal trunnions $a^1$ in bearings in the top carriage. The top carriage has two vertical cheeks C with reinforcements between them and with which a turn-table D is rigidly connected, see Fig. 8. This turn-table D, which is mounted on the under carriage E, constitutes the pivot of the mount. The under carriage is made in the shape of a square plate, see particularly Figs. 2, 7 and 8 and is provided with a circular recess $e^1$ suitable to receive the turn-table D. The bearing for the turn-table D is built as a ball thrust-bearing, the balls F of which run in grooves formed in the turn-table D and in the ball race $e^2$, which is set into the recess $e^1$ of the under carriage, see Figs. 6 to 8. The ball race $e^2$ is rigidly connected with the under carriage and is provided with an internal toothed gear $e^3$, the function of which will be explained farther on. To prevent the lifting of the top carriage from the under carriage, sector shaped jaws $e^4$ are secured on the under carriage which grip over the turn-table, see Figs. 2, 7 and 8. Between the top carriage C and the slide carrier A is inserted an elevating gear having a toothed arc G and a hand wheel $G^1$, see particularly Figs. 5 and 6. To turn the top carriage relative to the under carriage, a training gear has been provided. This training gear comprises a hand wheel H in driving connection with a vertical shaft $h^1$, which latter is carried in bearings on the top carriage and has at its lower end a toothed wheel $h^2$, Figs. 5 and 8. This toothed wheel is in mesh with the above mentioned internal gear $e^3$ of the ball race $e^2$. The under carriage E is provided with bearings $e^5$, Figs. 5 and 7, wherein the Z-shaped axle $i^1$ of the carriage wheels J may be secured. On the rear end of the under carriage is situated a projection $e^6$, Fig. 7, with which is rigidly connected the trail end K, provided with a spade $k^1$ and a trail-eye $k^2$, see Fig. 7. At its forward end the under carriage carries a projection $e^7$, wherein a cross-piece P, see Figs. 6 and 7, is mounted to rotate but not to slide. A leg M with a spade $m^1$ is secured, by means of a vertical bolt $p^2$ to each of eyes $p^1$ provided on the ends of the cross-piece P, protruding beyond the projection $e^7$, see particularly Fig. 6. In consequence of this arrangement, the legs M may be swung both around a horizontal and a vertical axis. When the legs M are swung sidewise they may rest in ]-shaped jaws $e^8$ provided on the under carriage E. In this position the legs may be firmly held by linked bars $m^2$, hinged to the legs, and held rigid by a sleeve coupling $m^3$.

On either side of the projection $e^6$, the under carriage E has a jaw $e^9$ similar to the jaws $e^8$. In each of these jaws $e^9$ a leg N, of ⌐-shape, is hinged by means of a vertical bolt $n^1$ to turn in such a manner, that it can take the positions indicated particularly in Figs. 2 and 7. In the position shown in Fig. 7, the legs are held rigid by the jaws $e^9$, on the one hand and by two pairs of linked bars $n^2$, on the other hand. One of the bars of each of the pairs of bars is hinged to one of the legs, and the other to the trail K. The bars are held in their straightened out position by means of sleeve couplings $n^3$. The free ends of the legs N have each a semi-circular recess $n^6$, Fig. 7, wherein the axles $i^1$ of the wheels J, when resting on the ground, may be secured by a hoop $n^4$. During transportation, the different parts of the carriage have the position seen in Fig. 3. The trail eye $k^2$ of the trail K rests in the limber hook $r^2$ of a limber R. The legs M are closed around the muzzle of the gun barrel and secured thereto by means of bolts $m^4$, Fig. 2, which are screwed into the eye $a^3$ of a hoop $a^2$ on the gun barrel. The legs M then sustain the gun barrel and the slide carrier A, that means, they relieve the elevating gear G $G^1$ from the jolting during travel. The legs N rest with their free ends on the trail K, Fig. 2, and are secured thereto in a suitable manner, as for instance by means of a chain. Has the carriage to be fired as field carriage, it is first unlimbered and the connection between the gun barrel and the legs M loosened. The legs are thereupon spread out and secured in the jaws $e^8$ by means of the bars $m^2$ and the sleeve coupling $m^3$ which is pushed over the joint of the bars. The parts will then take the position illustrated in Figs. 1 and 2. If the mount has to be set on the ground with the under carriage as foundation, one proceeds as follows. Before unlimbering, the legs M and N have first to be spread apart and secured in the jaws $e^8$ $e^9$ by means of the bars $m^2$ $n^2$ and sleeve couplings $m^3$ $n^3$, Fig. 7. The limber is thereupon propped up on the ground by means of the props $r^1$, Figs. 3 and 4, and the rope $w^1$ of a rope winch W, which is fastened on the limber, is attached to the trail K by means of a hook $w^2$ and an eye $k^3$. The carriage is then tilted by means of the rope winch into the position indicated in Fig. 4, whereby the spades $m^1$ of the legs M enter the ground, and the carriage wheels J are raised from the ground. The carriage wheels with their axles $i^1$ are furthermore removed from the under carriage E and the carriage by means of the winch W is lowered to the ground, Figs. 5, 6 and 7. The spade $k^1$ of the trail K thereby also enters the ground. Upon the removal of the hoops $n^4$ from the legs N the axles $i^1$ attached, are lastly pushed under the free ends of the legs N, and the axles $i^1$ secured to the legs N by putting back the hoop $n^4$ in its place. The gun then possesses a sufficiently large supporting surface to enable it to fire in all directions. How to proceed in again putting the carriage on its wheels by the use of the winch W as well as how to limber up, needs now no further explanation.

The carriage illustrated in Figs. 9 and 10 is provided with members on the trail K and the spade $k^1$, by means of which the legs N may be attached to the trail in such a manner that they form extensions thereto, thus increasing the stability of the mount when fired as field carriage. The members that serve to connect the legs N with the trail and the spade, comprise jaws $k^4$ situated on the spade and eyes $k^6$ on the ends of a cross-piece $k^5$ rotatable around a horizontal axis. It is then found to be advantageous to provide bolts $n^6$ beside the bolts $n^1$ for securing the legs corresponding to the position in Fig. 7 or as shown in dot and dash lines in Fig. 10, in place of the bars $n^2$ and the sleeve couplings $m^3$. During transportation of the carriage, the legs N are closed up over the trail and secured by means of the bolts $n^1$ to the jaws $n^9$ and by the bolts $n^6$ to the eyes $k^6$ of the cross-piece $k^5$; compare the dotted position of the legs N in Fig. 10. If it is desired to transfer the legs from this position to the one wherein they constitute extensions to the trail, the bolts $n^1$ are first withdrawn, and the trail next raised slightly. The legs are thereupon swung back around the axes of the bolts $n^6$ (situated in the eyes $k^6$) until they have entered under the jaws $k^4$. The cross-piece $k$ will thereby be turned slightly. If now the trail with the legs is dropped down on the ground, the cross-piece $k^5$ will turn back again, and the legs will take up the position relative to the jaws $k^4$ shown particularly in Fig. 9.

We claim:—

1. In a wheeled gun mount comprising an under carriage, a top carriage supporting the gun barrel and adapted to be trained for firing about 360° relatively to the under carriage, detachable wheels for said under carriage, a trail and legs on the gun mount, some of said legs being adapted to extend in forward direction and others to extend in the angles between the trail and said forward legs, so as to form together with the trail an all around foundation of the mount resting on the ground on the removal of said wheels.

2. In a wheeled gun mount comprising an under carriage, a top carriage supporting the gun barrel and adapted to be trained for firing about 360° relatively to the under carriage, detachable wheels for said under carriage, a trail, a trail eye on said trail for limbering up the gun mount and legs on the under carriage, some of said legs being adapted to extend forward and sidewise and some of said legs being adapted to extend in the angles between the trail and said forward and sidewise extending legs, so as to form together with the trail an all around foundation of the mount resting on the ground on the removal of the wheels.

3. In a wheeled gun mount comprising an under carriage and a top carriage supporting the gun barrel and adapted to be trained for firing about 360° relatively to the under carriage and a detachable wheel axle and a pair of wheels thereon, the combination of a trail on said under carriage with four legs hinged to said under carriage, a pair of said legs being adapted to extend forward and sidewise and another pair of said legs being adapted to extend in the angles between the trail and said forward and sidewise extending legs, so as to form together with the trail an all around foundation of the mount on the removal of the axle and its wheels.

4. In a wheeled gun mount comprising an under carriage and a top carriage supporting the gun barrel, the combination of a trail on said under carriage with legs hinged to said under carriage and means for rigidly securing the legs in the operating position, said means comprising fixed jaws for the under carriage and jointed bars connecting the legs and a sleeve coupling for keeping said bars rigid.

5. In a wheeled gun mount comprising an under carriage and a top carriage supporting the gun barrel, the combination of a trail on said under carriage with legs hinged to said under carriage and means for rigidly securing the legs in the operating position, said means comprising fixed jaws for the under carriage and jointed bars connecting the legs and a sleeve coupling for keeping said bars rigid, said legs being provided with spades at their free ends.

6. In a wheeled gun mount comprising an under carriage and a top carriage supporting the gun barrel, the combination of a trail on said under carriage, with rearward legs, a pair of forward legs hinged to said under carriage and constructed to fold over the muzzle of the gun-barrel and means on the gun muzzle for supporting the same during travel.

7. In a wheeled gun mount comprising an under carriage and a top carriage supporting the gun barrel, the combination of a trail on said under carriage, with a pair of rearwardly extending legs hinged to said under carriage as well as to the trail, said legs constructed to be swung rearwardly and locked by means of jaws on the trail to form extension pieces to said trail during the firing of the gun.

8. In a wheeled gun mount comprising an under carriage and a top carriage supporting the gun barrel, the combination of a trail on said under carriage a pair of wheels and a detachable axle arm for each wheel, with a pair of extension legs hinged to said under carriage and means at the free end of each of said legs for receiving one axle arm with one of said carriage wheels when said wheels are placed flat on the ground to give support to the mount.

9. A four wheeled gun carriage comprising a wheeled gun mount and a limber, said gun mount having forward extending legs and a rearward extending trail; a detachable wheel axle, a winch and tackle on the limber, said winch and tackle constructed to raise the trail off the ground while the mount is supported on the ground by the forward extending legs; whereby the detachable axle and wheels may be removed.

The foregoing specification signed at Barmen, Germany, this 20th day of February, 1912.

NORBERT KOCH. [L. S.]
GEORG HAYN. [L. S.]

In presence of—
HELEN NUFER,
A. NUFER.